(12) United States Patent
Parazoo et al.

(10) Patent No.: US 10,955,071 B1
(45) Date of Patent: Mar. 23, 2021

(54) UNDERGROUND DOUBLE WALL COAXIAL PIPING SYSTEM

(71) Applicants: Douglas Duane Parazoo, Scio, OR (US); Steve Costello, Scio, OR (US)

(72) Inventors: Douglas Duane Parazoo, Scio, OR (US); Steve Costello, Scio, OR (US)

( * ) Notice: Subject to any disclaimer, the term of this patent is extended or adjusted under 35 U.S.C. 154(b) by 0 days.

(21) Appl. No.: 16/368,558

(22) Filed: Mar. 28, 2019

Related U.S. Application Data

(60) Provisional application No. 62/650,164, filed on Mar. 29, 2018.

(51) Int. Cl.
| | | |
|---|---|---|
| *F16L 9/18* | (2006.01) | |
| *F16L 9/19* | (2006.01) | |
| *F16L 39/00* | (2006.01) | |

(52) U.S. Cl.
CPC ............... *F16L 9/20* (2013.01); *F16L 39/005* (2013.01); *F16L 2201/40* (2013.01)

(58) Field of Classification Search
CPC ........ F16L 9/20; F16L 39/005; F16L 2201/40
USPC .................. 138/155, 149, 148, 112, 114, 109
See application file for complete search history.

(56) References Cited

U.S. PATENT DOCUMENTS

| | | | | |
|---|---|---|---|---|
| 3,184,958 A * | 5/1965 | Eaton | ....................... | G01M 3/22 73/40.5 R |
| 3,246,917 A * | 4/1966 | Martin | ....................... | F16L 7/02 285/47 |
| 3,934,617 A * | 1/1976 | Henderson | ................ | F16L 9/18 138/114 |
| 4,103,320 A * | 7/1978 | de Putter | ................... | F16L 9/00 138/103 |
| 4,124,040 A * | 11/1978 | Miller | ....................... | F16L 3/00 138/109 |
| 5,996,643 A * | 12/1999 | Stonitsch | .............. | F16L 59/143 138/109 |
| 7,225,837 B1 * | 6/2007 | Kane | ......................... | F16L 7/00 138/108 |
| 7,647,947 B1 * | 1/2010 | Littlebrant | ............... | F16L 7/00 138/106 |
| 7,960,978 B2 * | 6/2011 | Keyes | .................... | F16L 59/143 324/694 |
| 2013/0049354 A1 * | 2/2013 | Chase | ..................... | F16L 21/04 285/93 |
| 2014/0314346 A1 * | 10/2014 | Thoma | .................... | F16C 17/12 384/16 |

\* cited by examiner

*Primary Examiner* — James F Hook
(74) *Attorney, Agent, or Firm* — Plager Schack LLP; Mark H. Plager; Eric Liou

(57) ABSTRACT

A double wall coaxial piping system with enhanced strength designed to transport a medium underground and minimize leaks is provided. The double wall coaxial piping system includes a plurality of pipe assemblies connected together to form a constructed pipe assembly with a first end and a second end. Each pipe assembly has an outer pipe and an inner pipe secured within the outer pipe. The inner pipe of each pipe assembly is continuously connected to the inner pipe of an adjacent pipe assembly in the plurality of pipe assemblies. Each end in the first and second ends of the constructed pipe assembly has a pair of plates coupled to the outer pipe of the pipe assembly at the end of the constructed pipe assembly and a packing layer disposed between the pair of plates.

10 Claims, 4 Drawing Sheets

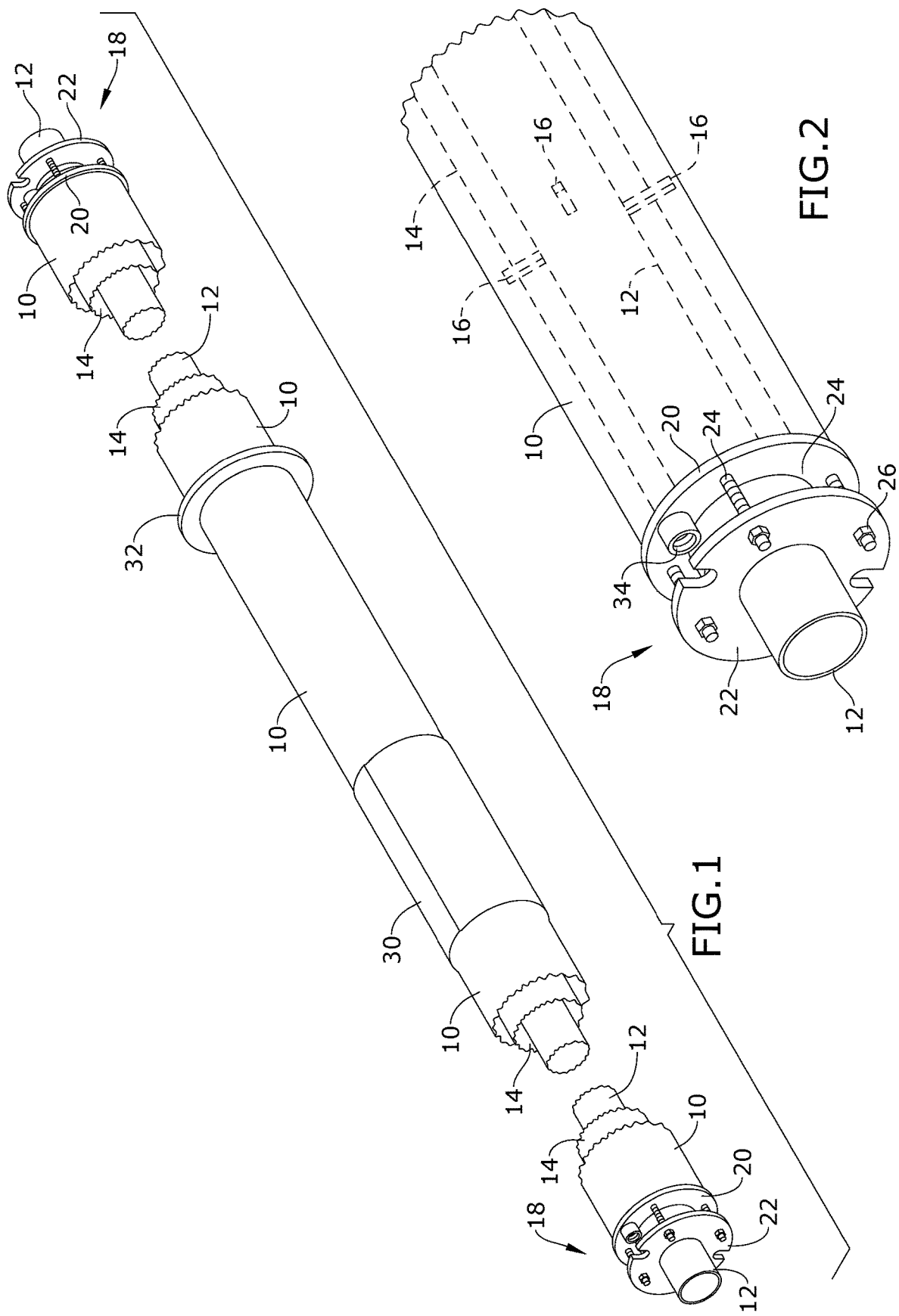

UNDERGROUND DOUBLE WALL COAXIAL PIPING SYSTEM

RELATED APPLICATION

The application claims priority to provisional patent application U.S. Ser. No. 62/650,164 filed on Mar. 29, 2018, the entire contents of which is herein incorporated by reference.

BACKGROUND

The embodiments herein relate generally to direct bury pipe systems used to transport different media such as water and steam underground. More specifically, embodiments of the invention relate to an underground double wall coaxial piping system with enhanced strength that reduces leaks in the piping system.

Direct bury pipe systems are commonly used to transport water, steam or other medium underground to a desired location such as a building. Each pipe system generally comprises a constructed assembly comprising a plurality of pipe segments connected together to form a desired length that connects the source of the medium to the destination such as a building or other location. The joints between adjacent pipe segments in the pipe assembly are wrapped by a thin shrink wrap material.

In this environment, the constructed pipe system is subject to a variety of problems due to the presence of ground water, which corrodes the pipe segments and forms holes thereon over time. Further, field joints in the pipe system between adjacent pipe segments are not properly sealed due to the use of weak shrink wrap materials. This causes segments in the pipe system to be more prone to additional leaks at these field joints.

As such, there is a need in the industry for an underground double wall coaxial piping system that addresses the limitations of the prior art, which provides a pipe system with enhanced strength that minimizes the likelihood for leaks throughout the pipe system. There is a further need for each end of the underground double wall coaxial piping system to have an improved seal to prevent ground water from entering the pipe system. There is a further need for the underground double wall coaxial piping system to allow for efficient pressure testing at the ends to check for leaks within the pipe system.

SUMMARY

A double wall coaxial piping system with enhanced strength configured to transport a medium underground and minimize leaks is provided. The double wall coaxial piping system comprises a plurality of pipe assemblies connected together to form a constructed pipe assembly with a first end and a second end, each pipe assembly in the plurality of pipe assemblies comprising an outer pipe and an inner pipe secured within the outer pipe, the inner pipe of each pipe assembly in the plurality of pipe assemblies continuously connected to the inner pipe of an adjacent pipe assembly in the plurality of pipe assemblies, each end in the first and second ends of the constructed pipe assembly comprising a pair of plates coupled to the outer pipe of the pipe assembly at the end of the constructed pipe assembly and a packing layer disposed between the pair of plates.

BRIEF DESCRIPTION OF THE FIGURES

The detailed description of some embodiments of the invention will be made below with reference to the accompanying figures, wherein the figures disclose one or more embodiments of the present invention.

FIG. 1 depicts a perspective view of certain embodiments of the double wall coaxial piping system;

FIG. 2 depicts a perspective view of certain embodiments of the double wall coaxial piping system;

DETAILED DESCRIPTION OF CERTAIN EMBODIMENTS

In certain embodiments of the invention as depicted in FIGS. 1-4, a double wall coaxial piping system (hereinafter referred to as "piping system") is configured for use underground to transport a medium such as steam, water or other substance between two locations. In one embodiment, the piping system transports the medium from a source to a building. The piping system is advantageous because it minimizes leaks of the medium passing through the system and comprises components with enhanced strength that are resistant to corrosion from ground water.

In certain embodiments of the invention as depicted in FIGS. 1, 3 and 5-6, the piping system comprises a plurality of pipe assemblies connected together to form a constructed pipe assembly with a first end and a second end. Each pipe assembly comprises outer pipe 10, inner pipe 12, insulation 14 and spacers 16. As depicted in FIGS. 2-7, inner pipe 12 is disposed within outer pipe 10 to form the double wall pipe assembly. Inner pipe 12 is configured to transport the medium. Outer pipe 10 protects inner pipe 12 from ground water and other environmental elements. In a preferred embodiment, outer pipe 10 and inner pipe 12 are preferably made from stainless steel. However, outer pipe 10 and inner pipe 12 may be made from alternative materials.

Figure 3:
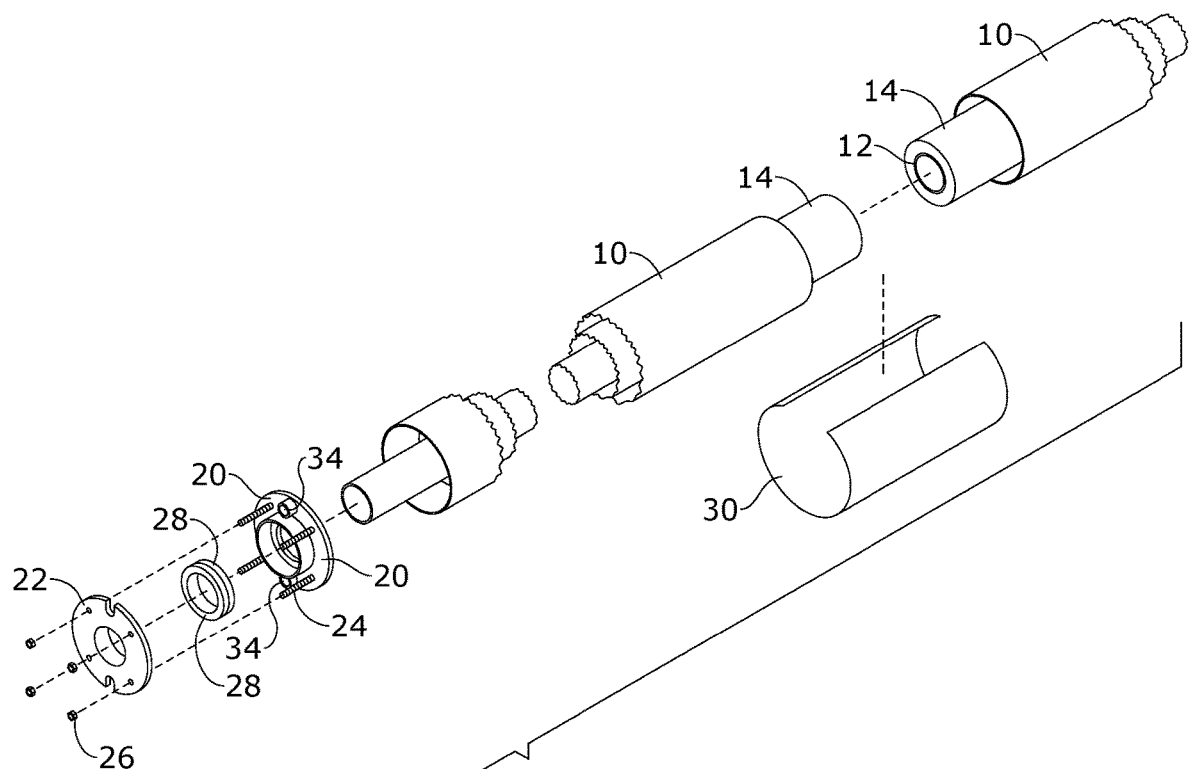
FIG. 3 depicts an exploded view of certain embodiments of the double wall coaxial piping system.
Figure 4:
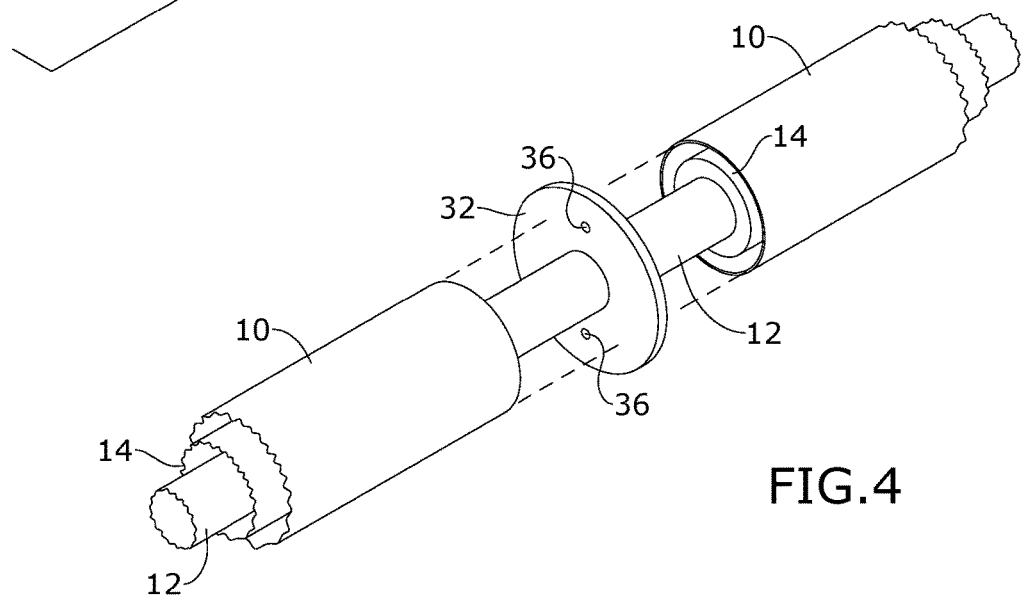
FIG. 4 depicts an exploded view of certain embodiments of the double wall coaxial piping system.
Figure 5:
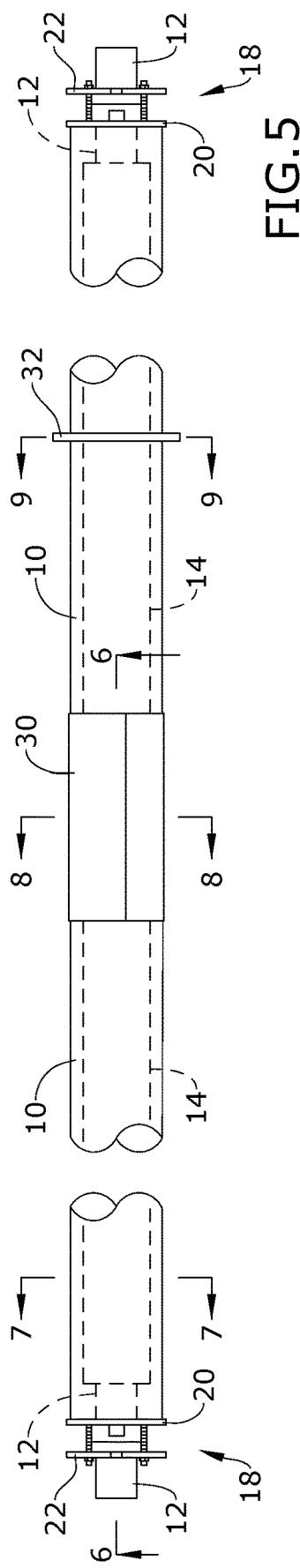
FIG. 5 depicts a top view of certain embodiments of the double wall coaxial piping system.
Figure 6:
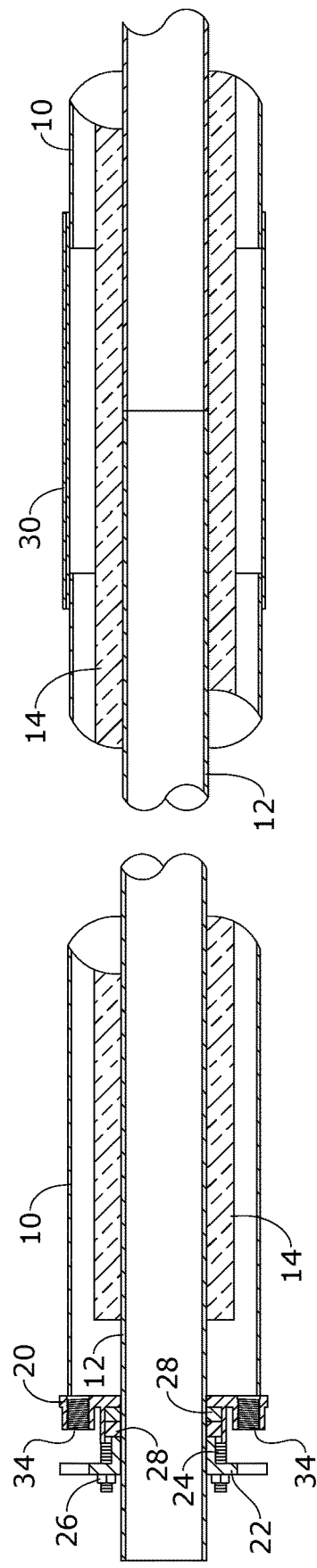
FIG. 6 depicts a section view of certain embodiments of the double wall coaxial piping system taken along line 6-6 in FIG. 5.
Figure 7:
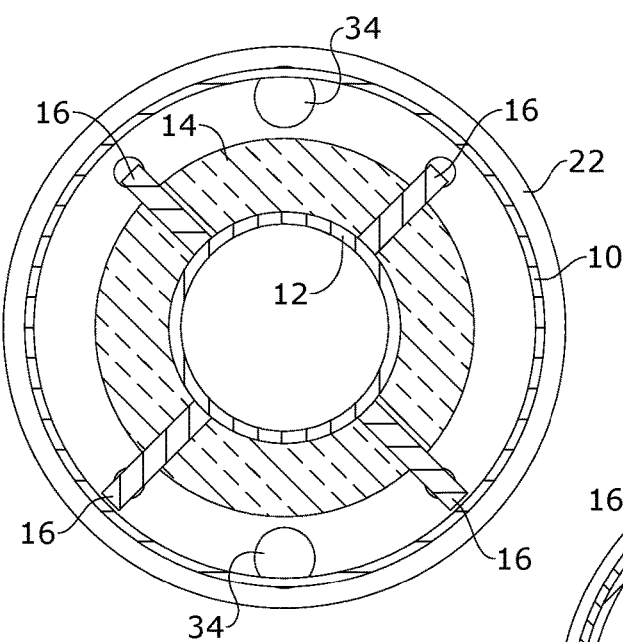
FIG. 7 depicts a section view of certain embodiments of the double wall coaxial piping system taken along line 7-7 in FIG. 5.
Figure 8:
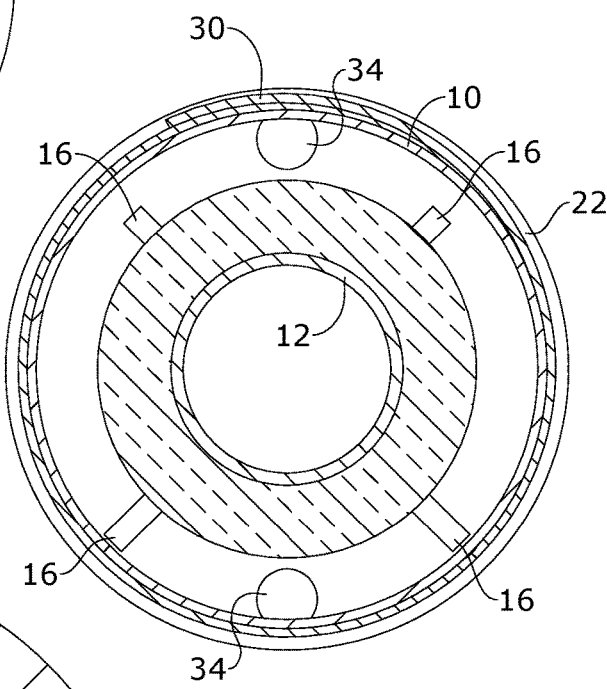
FIG. 8 depicts a section view of certain embodiments of the double wall coaxial piping system taken along line 8-8 in FIG. 5.
Figure 9:
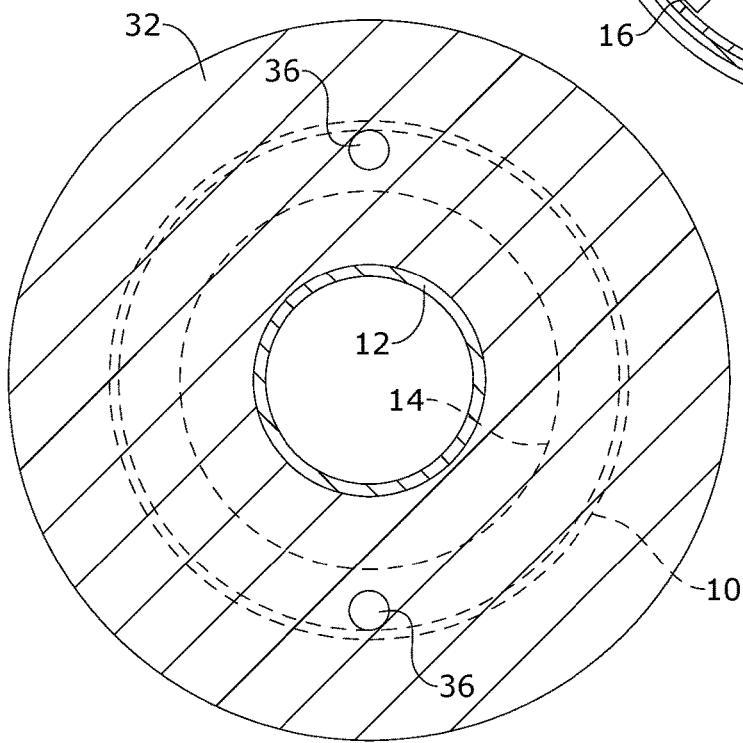
FIG. 9 depicts a section view of certain embodiments of the double wall coaxial piping system taken along line 9-9 in FIG. 5.

In one embodiment, a set of spacers 16 made from stainless steel is welded to inner pipe 12 of the pipe assembly and positioned no less than 3' apart from the next adjacent set of spacers 16 present along the length of inner pipe 12. Spacers 16 prevent contact between inner pipe 12 and outer pipe 10 in the pipe assembly. In one embodiment as depicted in FIG. 7, each set of spacers 16 comprises a first pair of spacers 16 and a second pair of spacers 16 welded to inner pipe 12 of the pipe assembly. Each spacer 16 in the first pair comprises a first length that is greater than a second length of each spacer 16 in the second pair of spacers 16. In an alternative embodiment, it shall be appreciated that any alternative number of spacers 16 can be used in each pipe assembly.

In one embodiment, insulation 14 is disposed between outer pipe 10 and inner pipe 12 in each pipe assembly to conserve heat within inner pipe 12. In one embodiment, insulation 14 is disposed around inner pipe 12 and is preferably 2" thick, but may be approximately 1"-4" thick in alternative embodiments. Insulation 14 is preferably made from mineral wool, but can be another material known in the field.

It shall be appreciated that the dimensions of outer pipe 10 and inner pipe 12 in each pipe assembly can vary in different embodiments. In one embodiment, inner pipe 12 comprises a diameter within the approximate range of 1½"-24". Outer pipe 10 comprises a diameter that is approximately 4"-6" larger than the diameter of inner pipe 12. The lengths of outer pipe 10 and inner pipe 12 can vary in each pipe assembly.

In certain embodiments as depicted in FIGS. 1, 3 and 5-6, a plurality of pipe assemblies are connected together to form a constructed pipe assembly with a desired length. In this configuration, inner pipes 12 of adjacent pipe assemblies are continuously connected together and aligned with each other. Similarly, outer pipes 10 of adjacent pipe assemblies are aligned with each other.

In one embodiment as depicted in FIGS. 1, 3, 5-6 and 8, joint sleeve 30 is welded to the exterior of outer pipes 10 in each adjacent pair of pipe assemblies to create a seal at the joint. Joint sleeves 30 help to seal the plurality of pipe assemblies at the connection joints of the plurality of pipe assemblies to minimize leaks. In a preferred embodiment, joint sleeve 30 is preferably made from stainless steel. However, joint sleeve 30 can be made from an alternative material known in the field.

In certain embodiments as depicted in FIGS. 1-3 and 5-6, packing seal 18 is coupled to each end of the constructed pipe assembly to seal the end and allow pressure testing to be performed on the piping system. In one embodiment, packing seal 18 comprises first packing plate 20, second packing plate 22 and packing layer 28 coupled to the end of the constructed pipe assembly. First and second packing plates 20, 22 are preferably made from stainless steel. However, first and second packing plates 20, 22 can be made from alternative materials.

More specifically, first packing plate 20 is directly attached to outer pipe 10 at the end of the constructed pipe assembly by a weld or alternative fastener and comprises a pair of threaded openings 34. Threaded openings 34 in first packing plate 20 allow the piping system to vent and drain as desired. In one embodiment, threaded openings 34 also allow a user to conduct pressure testing of outer pipes 10 in the piping system using equipment such as a compressor, pressure washer or other equipment known in the field to ensure ground water will not enter the system.

Second packing plate 22 is mechanically fastened to first packing plate 20 using a plurality of studs 24 and nuts 26. Although the figures depict four studs 24 and four nuts 26 used, it shall be appreciated that any alternative number of studs 24 and nuts 26 can be used to secure first and second packing plates 20, 22 together. In an alternative embodiment, alternative fasteners can be used to secure first and second packing plates 20, 22 together.

In one embodiment, packing layer 28 is disposed between first and second packing plates 20, 22. As studs 24 and nuts 26 are tightened, packing layer 28 is compressed by first and second packing plates 20, 22 to create a seal in the piping system. In a preferred embodiment, packing layer 28 is made from polytetrafluoroethylene (PTFE), graphite, or a combination of PTFE and graphite, and comprises a thickness of approximately ¼"-1". However, packing layer 28 can be made from alternative materials known in the field in alternative embodiments. In one embodiment, two packing layers 28 are disposed between first and second packing plates 20, 22. However, it shall be appreciated that any alternative number of packing layers 28 can be used in alternative embodiments.

In certain embodiments as depicted in FIGS. 1-3 and 5-6, first and second packing plates 20, 22 in the assembled configuration are oriented generally parallel to each other and comprise openings to permit inner pipe 12 at the end of the constructed pipe assembly to extend therethrough. This inner pipe 12 extends entirely through openings in first and second packing plates 20, 22 to form an exposed pipe portion that is generally connected to a building piping system (not shown) at the destination location or alternate system.

In an alternative embodiment as depicted in FIGS. 1, 4-5 and 9, any number of anchor rings 32 can be coupled to the constructed pipe assembly where it is determined that thermal growth of the piping system needs to be controlled due to environmental conditions. Each anchor ring 32 is preferably made from stainless steel and is welded to inner pipe 12 at the desired location on the piping system. Anchor ring 32 extends outward through outer pipe 10 to a position outside of the piping system. In one embodiment, outer pipe 10 is welded to anchor ring 32. In one embodiment, each anchor ring 32 comprises openings 36 to allow air to flow throughout the piping system. This allows pressure testing to be performed efficiently on the entire piping system.

In operation, the double wall coaxial piping system is assembled to the desired length and disposed underneath the ground. Inner pipes 12 at the ends of the piping system are connected to the desired locations such as a medium source, building piping system, and the like. Packing seals 18 at the ends of the constructed piping assembly and joint sleeves 30 create seals in the piping system to minimize leaks of the medium transported within inner pipes 12. The materials used in the double wall coaxial piping system provide a durable piping system that prevents corrosion and premature wear in the presence of ground water.

It shall be appreciated that the components of the double wall coaxial piping system described in several embodiments herein may comprise any alternative known materials in the field and be of any color, size and/or dimensions. It shall be appreciated that the components of the double wall coaxial piping system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A double wall coaxial piping system with enhanced strength configured to transport a medium underground and minimize leaks, the double wall coaxial piping system comprising:

a plurality of pipe assemblies connected together to form a constructed pipe assembly with a first end and a second end, each pipe assembly in the plurality of pipe assemblies comprising an outer pipe and an inner pipe secured within the outer pipe, the inner pipe of each pipe assembly in the plurality of pipe assemblies continuously connected to the inner pipe of an adjacent pipe assembly in the plurality of pipe assemblies such that the plurality of pipe assemblies forms an inner pipe system and an outer pipe system, each end in the first and second ends of the constructed pipe assembly comprising a pair of plates coupled to the outer pipe of the pipe assembly at the end of the constructed pipe assembly and a packing layer disposed between the pair of plates, wherein the packing layer is compressed by said pair of plates to create a seal in the piping system, wherein said pair of plates includes a first plate directly attached to the outer pipe of the pipe assembly at the end of the constructed pipe assembly, and a second plate mechanically fastened to the first plate, wherein the first plate comprises a vent opening configured to allow the piping system to vent, drain, and/or enable a user to conduct pressure testing of the outer pipe system, wherein said first and second plates are oriented generally parallel to each other and comprise coaxial openings, wherein the coaxial openings of the first and second plates are configured to permit the inner pipe of the pipe assembly at the end of the constructed pipe assembly to extend directly through the pair of plates.

2. The double wall coaxial piping system of claim 1, wherein the pair of plates at each end of the first and second ends of the constructed pipe assembly is mechanically fastened together and wherein the first plate includes two threaded vent openings.

3. The double wall coaxial piping system of claim 2, wherein the packing layer is made from a combination of polytetrafluoroethylene and graphite.

4. The double wall coaxial piping system of claim 2, wherein the second plate comprises a vent opening access space in alignment with the vent opening of the first plate.

5. The double wall coaxial piping system of claim 4, wherein each pipe assembly in the plurality of pipe assemblies comprises an insulation layer disposed between the outer pipe and inner pipe.

6. The double wall coaxial piping system of claim 5, wherein the insulation layer is made from mineral wool.

7. The double wall coaxial piping system of claim 5, wherein each pipe assembly in the plurality of pipe assemblies comprises a plurality of spacers coupled to the inner pipe, the plurality of spacers configured to prevent contact between the inner and outer pipes of the pipe assembly.

8. The double wall coaxial piping system of claim 7, wherein the plurality of spacers comprises a first pair of spacers with each spacer in the first pair comprising a first length and a second pair of spacers with each spacer in the second pair comprising a second length, wherein the first length is greater than the second length.

9. The double wall coaxial piping system of claim 8, further comprising a sleeve coupled to the outer pipes of adjacent pipe assemblies in the plurality of pipe assemblies.

10. The double wall coaxial piping system of claim 9, wherein at least one of the plurality of pipe assemblies comprises an anchor ring disposed around the inner pipe and extending through the outer pipe.

* * * * *